United States Patent
Bracegirdle

(10) Patent No.: US 8,697,780 B2
(45) Date of Patent: Apr. 15, 2014

(54) HIGH STRENGTH CONCRETE MADE WITH PVA REINFORCEMENT FIBERS AND ITS ASSOCIATED METHOD OF MANUFACTURE

(76) Inventor: Paul E. Bracegirdle, Newtown, PA (US)

( * ) Notice: Subject to any disclaimer, the term of this patent is extended or adjusted under 35 U.S.C. 154(b) by 0 days.

(21) Appl. No.: 13/601,718

(22) Filed: Aug. 31, 2012

(65) Prior Publication Data
US 2012/0322921 A1  Dec. 20, 2012

Related U.S. Application Data

(63) Continuation-in-part of application No. 12/723,612, filed on Mar. 12, 2010, now Pat. No. 8,297,026.

(60) Provisional application No. 61/227,433, filed on Jul. 21, 2009.

(51) Int. Cl.
| | |
|---|---|
| *C04B 24/26* | (2006.01) |
| *C08F 20/06* | (2006.01) |
| *C08F 118/02* | (2006.01) |
| *C04B 7/00* | (2006.01) |
| *C08F 216/06* | (2006.01) |
| *C04B 16/06* | (2006.01) |

(52) U.S. Cl.
CPC ............... *C04B 7/00* (2013.01); *C08F 216/06* (2013.01); *C04B 16/06* (2013.01); *C04B 16/0641* (2013.01)
USPC ............................ 524/2; 526/317.1; 526/319

(58) Field of Classification Search
CPC ...... C04B 7/00; C04B 16/06; C04B 16/0641; C08F 216/06
USPC .................................... 524/5; 526/317.1, 319
See application file for complete search history.

(56) References Cited

U.S. PATENT DOCUMENTS

| 4,093,471 A | 6/1978 | Greig |
| 7,419,543 B2 | 9/2008 | Destree |

FOREIGN PATENT DOCUMENTS

EP  0587383 A1 *  3/1994

* cited by examiner

*Primary Examiner* — William Cheung
(74) *Attorney, Agent, or Firm* — LaMorte & Associates P.C.

(57) ABSTRACT

An improved concrete mix composition and its associated method of manufacture. A traditional concrete mix is created by mixing cementitious material with sand, aggregate, admixture chemicals and water. After the traditional mix has been thoroughly mixed, reinforcement fibers of polyvinyl alcohol are added to the mix. The reinforcement fibers chemically bond to the cementitious material, thereby chemically integrating the reinforcement fibers into the mixture. The reinforcement fibers are supplied in multiple sizes. The reinforcement fibers include both long thick fibers and short thin fibers. In this manner, the smaller reinforcement fibers can fill voids around the larger, thicker reinforcement fibers. This helps prevent the development of stress cracks in the concrete and significantly increases the strength, durability, and life expectancy of the concrete.

16 Claims, 1 Drawing Sheet

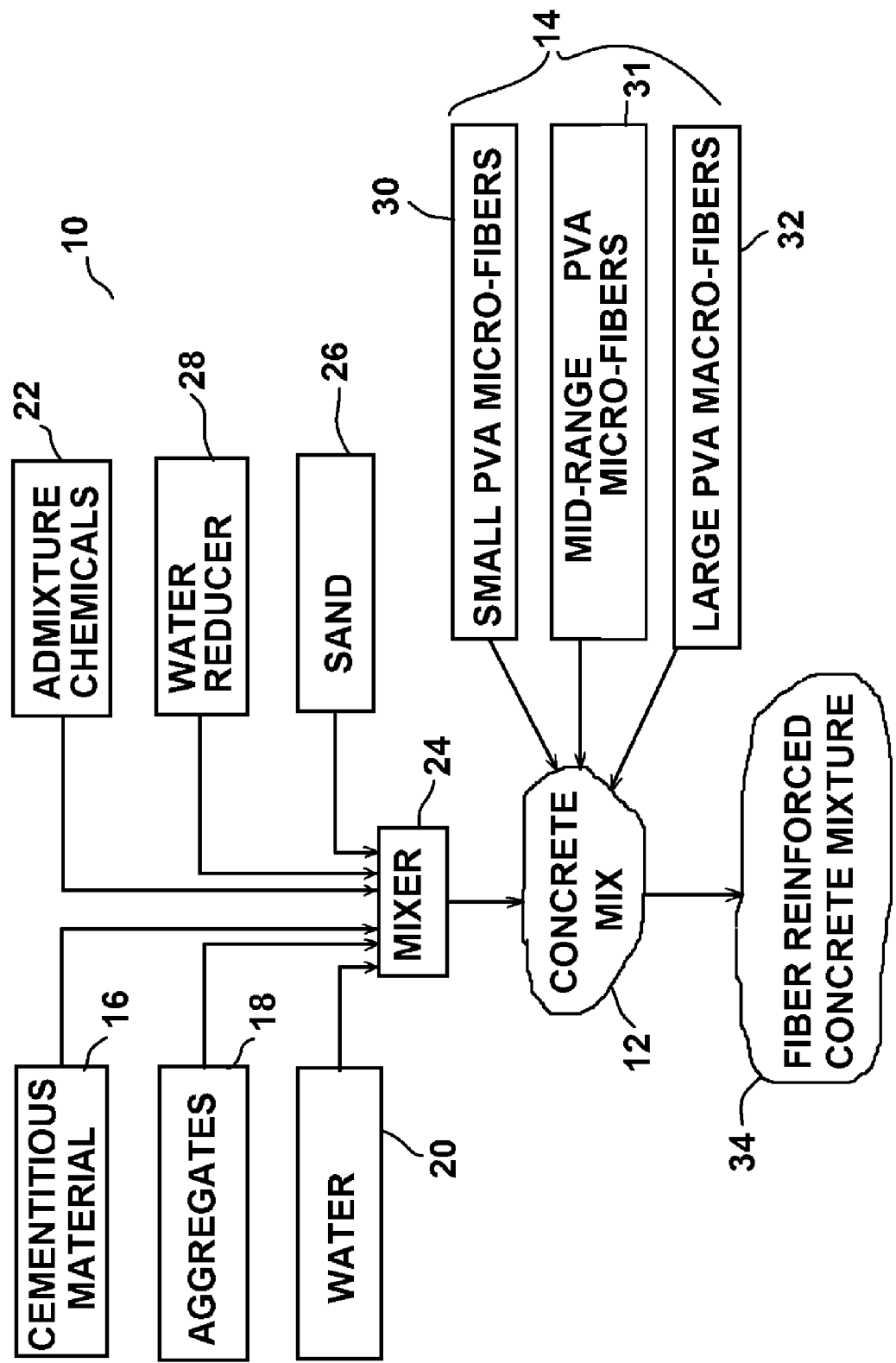

ly mixed, reinforcement fibers of polyvinyl alcohol are added to the mix. The reinforcement fibers chemically bond to the cementitious material, thereby chemically integrating the reinforcement fibers into the mixture.

HIGH STRENGTH CONCRETE MADE WITH PVA REINFORCEMENT FIBERS AND ITS ASSOCIATED METHOD OF MANUFACTURE

RELATED APPLICATIONS

This patent application is a continuation-in-part of U.S. patent application Ser. No. 12/723,612, filed Mar. 12, 2010 now U.S. Pat. No. 8,297,026 that claims the benefit of Provisional Patent Application No. 61/227,433, filed Jul. 21, 2009.

BACKGROUND OF THE INVENTION

1. Field of the Invention

In general, the present invention relates to concrete compositions that contain reinforcement fibers. More particularly, the present invention relates to concrete compositions containing fibers that chemically bond to one or more elements within the concrete composition.

2. Prior Art Description

There are many types of reinforcement fibers that have been added to concrete mixtures. The purpose of adding fibers to concrete is usually to improve the tensile strength, ductility, abrasion resistance, and/or impact resistance of the object being formed from the concrete. The use of reinforcement fibers can also provide concrete objects with some control over plastic and thermal cracking as well as post-crack strength.

Traditional fibers used to reinforce concrete mixtures include polypropylene fibers, polyolefin fibers, steel fibers and/or fiberglass fibers. Prior art that uses such traditional reinforcement fibers is exemplified by U.S. Pat. No. 4,093,471 to Greig, which discloses fiberglass reinforced cement composite materials; and U.S. Pat. No. 7,419,543 to Destree which discloses metal fibers used in a concrete mixture.

Reinforcement fibers are often used with high strength concrete mixes. Traditionally, high strength concrete mixes are those that exceed a 28-day compressive strength of between 5,000 psi (34 MPa) to 20,000 psi (136 MPa). Preferably, such high strength concrete mixes exceed a 7-day strength of 5,000 psi (34 MPa). Currently, high strength concrete mixes that incorporate reinforcing fibers for added ductility tend to lose considerable strength and toughness because of the presence of the fibers. Furthermore, the addition of the reinforcement fibers often adversely affects other important attributes, such as resistance to abrasion and resistance to cracking, particularly during freeze-thaw cycles.

When prior art reinforcement fibers, such as polypropylene, Nylon, fiberglass or steel are mixed with concrete, the reinforcement fibers merely become encapsulated in the cured concrete. The reinforcement fibers are chemically separate and distinct from the composition of the concrete. The fibers do not chemically react with the concrete mixture or otherwise chemically bond to any of the compounds found in the concrete mixture. Thus, as the cured concrete is repeatedly cycled with heat and stress, the reinforcement fibers can loosen within the concrete. Once loosened, the fiber serves no purpose other than to provide a stress concentration point in the concrete where a stress crack can develop.

Further, since traditional reinforcement fibers do not chemically bond with the concrete mixture, the reinforcement fibers create defects in the composition of the concrete. The number of defects is proportional to the amount of reinforcement fibers being used. If too many reinforcement fibers are used, the weakness in the concrete caused by the presence of the fibers can surpass the strength benefit added by the presence of the fibers. Thus, concrete products can easily be made weaker by the use of reinforcement fibers if too many are used or if the fibers are not uniformly dispersed within the concrete.

Annually, thousands of tons of fiber reinforced concrete products are reclaimed, recycled, milled or removed from service and disposed of as waste products due to failure. The failure mechanism affecting the concrete product is typically due to age, overweight loads, environmental freeze-thaw failure, abrasion, grinding, wear failure, impact or even accident. Concrete products that fail are usually expensive to remove, recycle and replace. If the concrete products were made tougher and stronger in the first place, there would be less expense required to maintain concrete infrastructure.

A need therefore exists for a system of reinforcing concrete mixtures with fibers, wherein the benefits of the added fibers are maximized and the adverse affects of the added fibers are minimized. A need also exists for a system of reinforcing concrete mixtures with fibers, wherein the fibers chemically bond to the concrete mixture, rather than being merely encapsulated by the concrete mixture. In this manner, the presence of fibers do not create defect voids in the physical structure of the concrete.

These needs are met by the present invention as described and claimed below.

SUMMARY OF THE INVENTION

The present invention is an improved concrete mix composition and its associated method of manufacture. A traditional concrete mix is created by mixing cementitious material with sand, aggregate, admixture chemicals and water. After the traditional mix has been thoroughly mixed, reinforcement fibers of polyvinyl alcohol are added to the mix. The reinforcement fibers chemically bond to the cementitious material, thereby chemically integrating the reinforcement fibers into the mixture.

The reinforcement fibers are supplied in multiple sizes. The reinforcement fibers include both long thick fibers and short thin fibers. In this manner, the smaller reinforcement fibers can reach areas within the mix and around the larger, thicker reinforcement fibers. This helps prevent the development of shrinkage and stress cracks in the concrete and significantly increases the strength, durability, wear resistance and life expectancy of the concrete.

BRIEF DESCRIPTION OF THE DRAWINGS

For a better understanding of the present invention, reference is made to the following description of an exemplary embodiment thereof, considered in conjunction with the accompanying drawings, in which:

FIG. 1 is a block diagram showing both the composition and the method of manufacture for the present reinforced cement mixture.

DETAILED DESCRIPTION OF THE DRAWINGS

The present invention system and method can be used to make a variety of concrete products. The exemplary embodiment of the invention illustrated and described presents a system and method that is used to make the improved high strength concrete with reinforcement fibers and a specific formulation of high-strength concrete. Such an exemplary embodiment is selected to set forth one of the best modes contemplated for the invention. However, the use of specific formulations of concrete presented should not be considered a limitation upon the scope of the claims. From the foregoing description, it can be seen that the present invention comprises an unusual and unobvious method for making an improved concrete mixture that contains reinforcement fibers. It will be appreciated by those skilled in the art that changes could be made to the formulations described in the foregoing description without departing from the broad inventive concepts thereof. It should be understood that the invention is not limited to the particular embodiment disclosed, but is intended to cover all modifications which are within the scope and spirit of the invention as claimed and equivalents thereof.

Referring to FIG. 1, an exemplary process 10 is illustrated for producing a high strength concrete mix 12 that is strengthened by a specialty blend of reinforcement fibers 14. The concrete mix 12 is comprised primarily of cementitious material 16, aggregates 18, water 20, and admixture chemicals 22. The cementitious material 16 can be a type "1", type "2" or type "3" cement. Other variations of cement products such as type "K" or even ultra-high-strength cementitious ingredients such as silica fume or fast-setting magnesium-based cements may also be used. More eco-friendly, environmentally sustainable pozzolans, or cement-like products such as fly ash or finely ground blast furnace slag may be used as well.

The cementitious material 16 is added into a mixer 24 in amounts between 600 and 900 pounds (273 kg to 409 kg) per cubic yard. The mixer 24 can be a stationary mixer or a mixing truck. Coarse aggregates 18 are added to provide proper gradation and strength. The coarse aggregates 18 are preferably present in a total combined weight between 1,200 and 1,800 pounds (545 kg to 818 kg) per cubic yard. Additionally, sand 30 in amounts between 1,000 and 1,600 pounds (454 kg to 727 kg) per cubic yard are also added. The water 20 is added in amounts between 210 and 315 pounds (95 kg to 143 kg) per cubic yard. A water reducer 28 may be used in amounts between 30 and 50 ounces (1.1 L to 1.9 L) per cubic yard depending on the concrete type. Other necessary or specified admixture chemicals 22 such as air entraining agents, retarders or accelerators can be added.

Depending on the application, the ingredients of the concrete mix 12 are conveyed to the mixer 24. The mixer 24 can be a stationary mixer or a transit mix truck. The reinforcement fibers 14 are then added.

The reinforcement fibers 14 are made from polyvinyl alcohol (PVA). The reinforcement fibers 14 of PVA chemically bond to the cementitious composition within the concrete mix 12 when the reinforcement fibers 14 are exposed to moisture and alkalinity present within the concrete mix 12. The preferred cementitious composition is a Portland cement-based concrete mixture or other such pozzolan-based concrete mixtures.

The reinforcement fibers 14 of PVA can be uniform in size. However, this is not preferred. What is preferred is a blend of different size reinforcement fibers 14. The reinforcement fibers 14 preferably include a volume of small PVA micro-fibers 30, a volume of mid-range PVA micro-fibers 31 and/or a volume of large PVA macro-fibers 32. The small PVA micro-fibers 30 have a filament diameter of about 20 microns to 40 microns with a cut length of about 0.25" to 0.375" (6 mm to 8 mm). The mid-range PVA micro-macro fibers 31 have a filament diameter of about 100 microns to 200 microns with a cut length of about 0.5" to 0.75" (13 mm to 19 mm). Lastly, the large PVA macro-fibers 32 have a diameter of about 400 microns to 600 microns with a cut length of about 1" to 2" (25 mm to 50 mm). It will therefore be understood that the large PVA macro-fibers 32 are 20×-30× wider and more than twice as long as the small PVA micro-fibers 30. Furthermore, the mid-range PVA micro-fibers 31 are 3×-10× larger and nearly twice as long as the small PVA micro-fibers 30.

The use of different sized reinforcement fibers 14 is important. The larger reinforcement fibers provide strength and ductility to the concrete mix 12. The smaller reinforcement fibers fill the spaces between the large fibers and prevent stress fractures from developing about the large fibers as well as improve abrasion resistance and crack control. Furthermore, since all of the reinforcement fiber 14 are made of PVA and are molecularly bonded to the cementitious composition within the concrete mix 12, the reinforcement fibers 14 will not become loose as the concrete expands and contracts with temperature changes or changing force loads.

The small PVA micro-fibers 30 have a filament tensile strength of about 210 ksi to 240 ksi (1.4 GPa to 1.6 GPa) and a flexural strength of about 5500 ksi to 4200 ksi (39 GPa to 30 GPa). The mid-range PVA micro-macro fibers 31 have a filament tensile strength of about 150 ksi to 180 ksi (1.0 GPa to 1.2 GPa) and a flexural strength of about 3600 ksi to 4200 ksi (25 GPa to 29 GPa). The large PVA macro-fibers 32 have a filament tensile strength of about 120 ksi (0.8 GPa) and a flexural strength of about 3300 ksi (23 GPa).

The reinforcement fibers 14 are preferably added to the concrete mix 12 with PVA macro-fibers 32 being at 4 to 7 pounds (1.9 kg to 3.4 kg) per cubic yard. The small and/or mid-range PVA Micro-fibers 30, 31 are added in preferred dose of 1 to 6 pounds (0.45 kg to 2.7 kg) per cubic yard.

It is preferred to mix all the high strength concrete ingredients together for a minimum of about four minutes in a mixer 24 prior to adding the reinforcement fibers 14. After the four minute mixing of the high strength concrete, the reinforcement fibers 14 should be added slowly at the pre-determined dose or blend, either together or separately, into the mixer 24. In the instance of all the mixing done in a mixing truck, the reinforcement fibers 14 should be added when the truck is rotating at a slow mixing speed. The slow mixing speed allows the reinforcement fibers 14 to disperse throughout the mixture. Once all the reinforcement fibers 14 are dispensed, the mixing process continues at full mixing speed for about five minutes. After the drive from plant to the project site, the fiber reinforced high strength concrete mix 34 contained in a mix truck should be mixed once again for four minutes and just prior to discharge from the mix truck to minimize any possible segregation.

The fiber reinforced high strength concrete mix 34 has been tested. For the test, a reference batch of the concrete mix 12 as described previously was made. The reference batch included every ingredient listed in the quantities provided, except without having the reinforcement fibers 14 added. The concrete mix 12 without reinforcement fibers 14 was made and samples were taken to prepare test cylinders in accordance with ASTM C39 along with test beams in accordance with ASTM C78. The samples were cast, stripped in accordance with the standard, and then moisture cured.

In the second set of tests, a batch of the fiber reinforced high strength concrete mix 34 was produced. The second batch included every ingredient listed in the mix quantities described above, including the addition of the reinforcement fibers 14 at doses of 6 lb/CY (2.7 kg/CY) of the large PVA macro fiber and 3 lb/CY (1.3 kg/CY) of the small PVA micro fiber. The fiber reinforced concrete mix 34 was made and test cylinders in accordance with ASTM C39 along with test beams for ASTM C78 were all cast then stripped in accordance with the standard. The test cylinders and beams were moisture cured adjacent the reference cylinders and beams made in the first batch. After 28-days, both the reference batch and second batch of cylinders and beams were removed from curing and tested in accordance with the test program. The results of the tests by the laboratory are as follow:

| Test Standard | Results no Fibers | Results with Fibers |
|---|---|---|
| ASTM C39 Compression | 61 MPa | 72 MPa |
| ASTM C78 MOR | 5.9 MPa | 6.5 MPa |
| ASTM C803 Probe | 25 mm deep | 17 mm deep |
| ASTM C42 Drill | 17 mm deep | 11 mm deep |

The ASTM C39 Compression Test was performed first on cylinders formed from the reference concrete mix 12. Those cylinders shattered completely at failure load of 8.8 ksi (61 MPa). The second test was performed on the fiber reinforced high strength concrete mix 34. Those fiber reinforced cylinders remained intact at failure load of 10.5 ksi (72 MPa), demonstrating the improved ductility, compressive strength and toughness provided by the reinforcement fibers 14.

An ASTM C78 Beam Test was performed first on reference concrete mix 12 made without the reinforcement fibers 14. The beams tested at a modulus of rupture (MOR) of 846 psi (5.9 MPa). The same beam test was then performed on identical high strength concrete mix 34 including the blend of the reinforcement fibers 14. The high strength beams with reinforcement fibers 14 tested at a MOR of 926 psi (6.5 MPa) demonstrating the improved flexural strength and toughness provided by the reinforcement fibers 14. An ASTM C803 Windsor Probe Test was performed that used a .22 caliber-propelled stud to measure impact resistance and toughness. The Windsor Probe tests were performed first on beams cast from the reference concrete mix 12 without reinforcement fibers 14. The beams made without reinforcement fibers 14 cracked completely through the beam with a stud penetration of 1" (25 mm). The Windsor Probe Tests were then performed on beams cast with mix made from the fiber reinforced high strength concrete mix 34 having reinforcement fibers 14. The second tested beams did not show any cracks or failure and with a stud penetration of only ⅝" (17 mm), demonstrating improved impact and fracture resistance as well as toughness provided by the reinforcement fibers 14.

An ASTM C42 Core Drill Test was performed using a 4" (10 cm) diamond-tipped core drill. The drill was applied to the beam surface continuously under its own weight for exactly two (2) minutes to measure abrasion resistance and toughness. The core drill tests were performed first on beams cast from reference concrete mix 12 without the reinforcement fibers 14. Those beams drilled to a depth of ⅝" (17 mm) in two (2) minutes. The core drill tests were then performed on beams cast from the same fiber reinforced high strength concrete mix 12 made with the reinforcement fibers 14. Those beams drilled only to a depth of ⁷⁄₁₆" (11 mm) in two (2) minutes. The core drill tests measure the improvement to resist cutting provided by the mix made with reinforcement fibers 14 demonstrating improved abrasion resistance and toughness provided by the reinforcement fibers 14.

In another series of tests, flat planks were made and tested. A first set of planks was made from the concrete mix 12 without reinforcement fibers 14. The concrete mix 12 was cast into flat test planks 2 inches thick, 12 inches wide and 48 inches long. The planks were cast in accordance with the standard method and then cured.

In a second set of plank tests, a batch of the fiber reinforced concrete mix 34 was made including a test dose of only small PVA micro fiber 30 at 3 lb/CY (1.4 kg/CY). The planks were produced and made into the same 2 inch thick, 12 inch wide and 48 inch long flat test plank. The second set of planks included every ingredient listed in the concrete mix quantities described above but included the addition of the small PVA micro reinforcement fibers 30. The fiber reinforced concrete planks were cast in accordance with the standard and then cured adjacent the test panels from the first batch.

In a third set of plank tests, a test batch of fiber reinforced concrete mix 34 was made including a preferred dose of only small PVA micro fiber at 6 lb/CY (2.8 kg/CY). The planks were produced and made into the same 2 inch thick, 12 inch wide and 48 inch long flat test plank. The third set of planks included every ingredient listed in the mix quantities described above but included the addition of the small PVA micro reinforcement fibers 30. The fiber reinforced concrete panels were cast in accordance with the standard and then cured adjacent the test planks from the first and second batch.

After 28-days, the reference batch of planks, the second batch of planks and the third batch of planks were removed from curing and tested in accordance with the plank flexural strength test ASTM C78. The results of the tests by the laboratory are as follow:

| Test Standard | No Fibers | 1.4 kg/cy | 2.8 kg/cy |
|---|---|---|---|
| Load at Failure | 195 kg | 304 kg | 368 kg |
| Deflection | 0.55 mm | 0.75 mm | 0.8 mm |

The first Load at Failure Test ASTM C78 was performed on the planks made from the reference concrete mix 12. Those planks failed with an applied load of 430 pounds (195 kg) at a deflection of 0.2" (0.55 mm).

The second Load at Failure Test ASTM C78 was performed on the planks made with the mix reinforced with 3 lb/CY (1.4 kg/CY) of small PVA micro fibers 30. Those planks failed with an applied load of 670 pounds (304 kg) at a deflection of 0.3" (0.75 mm).

The third Load at Failure Test ASTM C78 was performed on the planks made with the mix reinforced with 6 lb/CY (2.8 kg/CY) of small PVA micro fibers 30. Those planks failed with an applied load of 810 pounds (368 kg) at a deflection of 0.32" (0.8 mm).

Even though only the small PVA micro-fibers 30 were used, the planks reinforced with the micro fibers demonstrate the improved ductility and flexural strength provided by at least some of the reinforcement fibers 14.

In every test performed, the fiber reinforced high strength concrete mix 34 made with a small PVA micro fibers 30 or the blend of reinforcement fibers 14 tested better when compared to the identical concrete mix made without the reinforcement fibers 14.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:
1. A concrete mix composition, comprising:
cementitious material;
water;
sand;
aggregate; and
water insoluble reinforcement fibers fabricated from polyvinyl alcohol that chemically bond to said cementitious material when mixed with both said cementitious material and water, wherein said reinforcement fibers include a first volume of small fibers and a second volume of larger fibers, wherein said small fibers have an average length under 0.75 inches and an average width under 200 microns, and wherein said large fibers have an average length over one inch and an average width over 400 microns.

2. The composition according to claim 1, wherein said larger fibers are at least ten times wider than said small fibers.

3. The composition according to claim 1, wherein said small fibers have an average length between 0.25 inches and 0.375 inches.

4. The composition according to claim 1, wherein said reinforcement fibers further includes a third volume of mid-sized fibers that are larger than said smaller fibers and smaller than said larger fibers.

5. The composition according to claim 1, wherein said reinforcement fibers have an average tensile strength of between 210 ksi and 240 ksi.

6. The composition according to claim 1, wherein said larger fibers have an average tensile strength of approximately 120 ksi.

7. The composition according to claim 1, wherein said small fibers have an average flexural strength of 4200 and 5500 ksi.

8. The composition according to claim 7, wherein said larger fibers have an average flexural strength of approximately 3300 ksi.

9. The composition according to claim 1, wherein said small fibers are added at a density of between one and six pounds per cubic yard of said composition.

10. The composition according to claim 9, wherein said larger fibers are added at a density of between four and seven pounds per cubic yard of said composition.

11. A concrete mix composition, comprising:
cementitious material;
water;
sand;
reinforcement fibers fabricated from polyvinyl alcohol that chemically bond to said cementitious material when mixed with both said cementitious material and water, wherein said reinforcement fibers include short fibers that are under one inch long and long fibers that are over one inch long, wherein said short fibers have an average width that is less than half that of said long fibers.

12. The composition according to claim 11, wherein said short fibers have an average width of between 20 microns and 40 microns.

13. The composition according to claim 11, wherein said short fibers have an average length between 0.25 inches and 0.75 inches.

14. The composition according to claim 11, wherein said short fibers are added at a density of between one and six pounds per cubic yard of said composition.

15. The composition according to claim 11, wherein said long fibers are added at a density of between four and seven pounds per cubic yard of said composition.

16. A method manufacturing an improved concrete mix composition, comprising:
mixing a cementitious material with water, sand and at least one aggregate to create a concrete mixture;
providing a volume of reinforcement fibers fabricated from polyvinyl alcohol in both a large size and a small size, wherein said small size of said reinforcement fibers have a length under 0.75 inches and a width under 200 microns, and wherein said large size of said reinforcement fibers have a length over one inch and a width over 400 microns;
mixing said reinforcement fibers into said concrete mixture, wherein said reinforcement fibers chemically bond to said cementitious material and reinforce said concrete mixture.

* * * * *